(12) United States Patent
O'Connor et al.

(10) Patent No.: US 11,684,011 B2
(45) Date of Patent: Jun. 27, 2023

(54) AUTOMATIC FILL CONTROL BASED ON VISUAL IDENTIFICATION OF GRAIN RECEIVING VEHICLES

(71) Applicant: Deere & Company, Moline, IL (US)

(72) Inventors: Kellen O'Connor, Grimes, IA (US); Scott Miller, Ankeny, IA (US); Jeremy J. Faust, Grimes, IA (US); Zachary T. Bonefas, Grimes, IA (US)

(73) Assignee: Deere & Company, Moline, IL (US)

( * ) Notice: Subject to any disclaimer, the term of this patent is extended or adjusted under 35 U.S.C. 154(b) by 377 days.

(21) Appl. No.: 16/861,512

(22) Filed: Apr. 29, 2020

(65) Prior Publication Data
US 2021/0337729 A1  Nov. 4, 2021

(51) Int. Cl.
*A01D 41/127* (2006.01)
*A01D 43/073* (2006.01)
*A01D 43/08* (2006.01)
*B60W 10/30* (2006.01)

(52) U.S. Cl.
CPC ......... *A01D 41/127* (2013.01); *A01D 43/073* (2013.01); *A01D 43/087* (2013.01); *B60W 10/30* (2013.01); *B60W 2300/158* (2013.01); *B60W 2420/42* (2013.01)

(58) Field of Classification Search
CPC .............. A01D 41/127; A01D 41/1217; A01D 41/1275; A01D 43/073; A01D 43/087; A01D 90/00–90/16
See application file for complete search history.

(56) References Cited

U.S. PATENT DOCUMENTS

| | | | |
|---|---|---|---|
| 8,781,692 B2* | 7/2014 | Kormann | A01D 43/073 56/153 |
| 9,072,227 B2* | 7/2015 | Wenzel | A01F 12/50 |
| 9,119,342 B2 | 9/2015 | Bonefas | |
| 9,326,443 B2* | 5/2016 | Zametzer | A01D 41/127 |
| 9,497,898 B2* | 11/2016 | Dillon | B65G 67/24 |
| 9,554,499 B2* | 1/2017 | Müller | A01B 69/003 |
| 9,740,208 B2* | 8/2017 | Sugumaran | H05K 999/99 |
| 10,317,272 B2* | 6/2019 | Bhavsar | G01G 23/01 |
| 10,827,676 B2* | 11/2020 | Dighton | A01D 41/141 |
| 10,830,634 B2* | 11/2020 | Blank | G01G 19/086 |
| 2011/0066337 A1* | 3/2011 | Kormann | A01D 43/073 701/50 |
| 2013/0211675 A1 | 8/2013 | Bonefas | |

(Continued)

FOREIGN PATENT DOCUMENTS

| | | | | |
|---|---|---|---|---|
| EP | 1219153 B1 * | 2/2006 | ........... | A01B 69/008 |
| EP | 3289852 A1 | 3/2018 | | |

OTHER PUBLICATIONS

Extended European Search Report and Written Opinion issued in European Patent Application No. 21164074.3, dated Aug. 25, 2021, in 08 pages.

*Primary Examiner* — Alicia Torres
*Assistant Examiner* — Madeline I Runco
(74) *Attorney, Agent, or Firm* — Joseph R. Kelly; Kelly, Holt & Christenson PLLC

(57) ABSTRACT

A camera captures an image of a portion of a cart and accesses stored maps that map visual features of carts to a set of settings that are applied to an automatic fill control system. A map that matches visual features of the cart, in the captured image, is identified and the settings in that map are applied to the automatic fill control system.

20 Claims, 11 Drawing Sheets

(56) References Cited

U.S. PATENT DOCUMENTS

| | | |
|---|---|---|
| 2013/0213518 A1 | 8/2013 | Bonefas |
| 2014/0311113 A1 | 10/2014 | Bonefas |
| 2015/0264866 A1* | 9/2015 | Foster .................. A01B 69/004 414/21 |
| 2017/0206645 A1 | 7/2017 | Bonefas et al. |
| 2017/0297563 A1* | 10/2017 | Kava ..................... B60W 40/12 |
| 2021/0015039 A1* | 1/2021 | Vandike .................... G06T 7/60 |

* cited by examiner

AUTOMATIC FILL CONTROL BASED ON VISUAL IDENTIFICATION OF GRAIN RECEIVING VEHICLES

FIELD OF THE DESCRIPTION

The present description relates to filling grain carts, semitrailers and other agricultural receiving vehicles. More specifically, the present description relates to automatically identifying settings for controlling a harvester to perform a fill strategy based on optical characteristics of the receiving vehicle.

BACKGROUND

There are a wide variety of different types of agricultural vehicles. Some vehicles include harvesters, such as forage harvesters, and other harvesters, that harvest grain or other crop. Such harvesters often unload into carts, which may be pulled by tractors, or semitrailers, as the harvesters are moving.

By way of example, while harvesting in a field using a forage harvester, an operator attempts to control the forage harvester to maintain harvesting efficiency, during many different types of conditions. The soil conditions, crop conditions, etc. can all change. This may result in the operator changing control settings. This means the operator needs to devote a relatively large amount of attention to controlling the forage harvester.

At the same time, a semitruck or tractor-pulled cart, is often in position relative to the forage harvester (e.g., alongside the forage harvester or behind the forage harvester) so that the forage harvester can fill the truck or cart, while moving through the field. In some current systems, this requires the operator of the forage harvester to control the position of the unloading spout and flap so that the truck or cart is filled evenly, but not over filled. Even a momentary misalignment between the spout and the truck or cart may result in hundreds of pounds of harvested material being dumped on the ground, rather than in the truck or cart.

The discussion above is merely provided for general background information and is not intended to be used as an aid in determining the scope of the claimed subject matter.

SUMMARY

A camera captures an image of a portion of a cart and accesses stored maps that map visual features of carts to a set of settings that are applied to an automatic fill control system. A map that matches visual features of the cart, in the captured image, is identified and the settings in that map are applied to the automatic fill control system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, it can be very difficult for an operator to maintain high efficiency in controlling a forage harvester, and also to optimally control the unloading mechanisms to achieve an efficient fill strategy in filling a receiving vehicle. Such a fill strategy desirably results in a receiving vehicle that is evenly full, so that there are no empty spots in the receiving vehicle, or sub-optimally filled spots, and so that the vehicle is not over filled. This often means that the operator needs to control the position of the spout relative to the receiving vehicle, and the flaps (to control material trajectory), offsets between the spout and the edges of the receiving vehicle (both front and rear edges, and side edges), among other things.

In order to address these issues, some automatic cart filling control systems have been developed to automate portions of this process. These types of systems currently provide automation for simplifying the unloading process. One such automatic fill control system as is described in greater detail below, uses remote sensing to track the position of the receiving vehicle and to determine the location of where to deposit crop in the receiving vehicle. A stereo camera on the spout of the harvester captures an image of the receiving vehicle. An image processing system determines dimensions of the receiving vehicle, and the distribution of the crop deposited inside it. The sensing system also detects crop height within the receiving vehicle, in order to automatically aim the spout toward empty spots and control the flap position to achieve a more even fill, while reducing spillage.

This differs from a system that uses fiducial markings. Such markings require maintenance of both the markings and the database for the markings.

Figure 1:
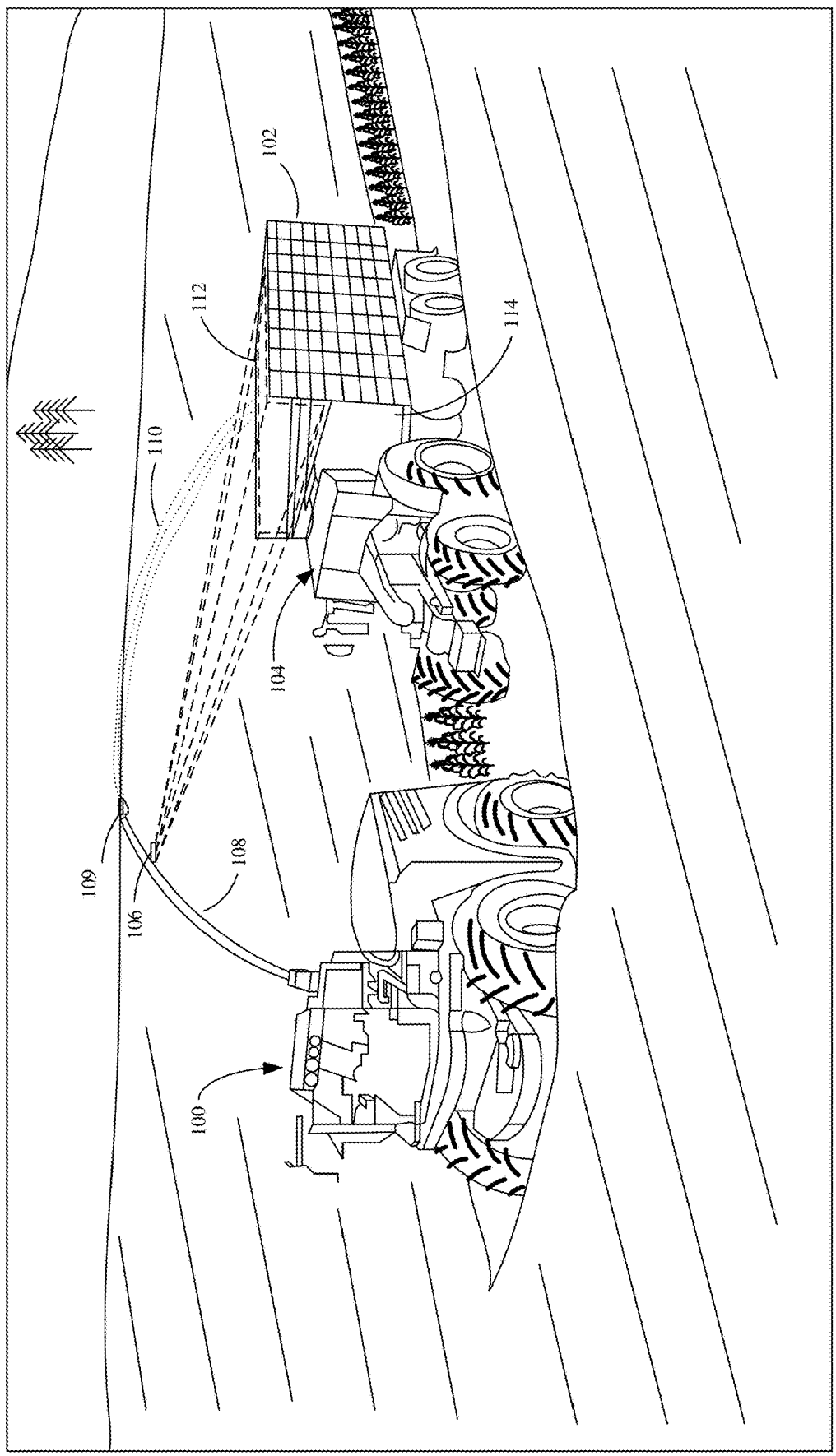
FIG. 1 is a pictorial illustration of one example of a forage harvester filling a tractor-pulled receiving vehicle, with the receiving vehicle following the forage harvester.

FIG. 1 is a pictorial illustration showing one example of a self-propelled forage harvester 100 filling a tractor-pulled drain cart (or receiving vehicle) 102. In the example shown in FIG. 1, a tractor 104, that is pulling grain cart 102, is positioned directly behind forage harvester 100. In the example illustrated in FIG. 1, forage harvester 100 includes an automatic cart filling control system (described in greater deal below) that uses a camera 106 mounted on the spout 108 and flap 109 through which the harvested material 110 is traveling. Camera 106 captures an image of the receiving area 112 of cart 102. The automatic cart filling control system includes image processing, as discussed above, that can gauge the height of harvested material in cart 102, and the location of that material. It thus automatically controls the position of spout 108 to direct the trajectory of material 110 into the receiving area 112 of cart 102 to obtain an even fill throughout the entire length of cart 102, while not overfilling cart 102. By automatically it is meant, for example, that the operation is performed without further human involvement except, perhaps, to initiate or authorize the operation.

It can be seen in the example of FIG. 1, that the camera 106 can capture an image of a portion of the cart 102. For instance, it can capture an image of the forward portion 114 of cart 102. Thus, in one example, optical or visual features of that forward portion 114 of cart 102 can be used to uniquely identify cart 102, or to identify the type of the cart 102. A unique cart identifier, or type identifier, can be used to automatically determine and apply settings values to the automatic cart filling control system so that the cart 102 is filled, according to a predetermined strategy, without the operator needing to interact with the automatic cart filling control system to input settings corresponding to the cart.

Figure 2:
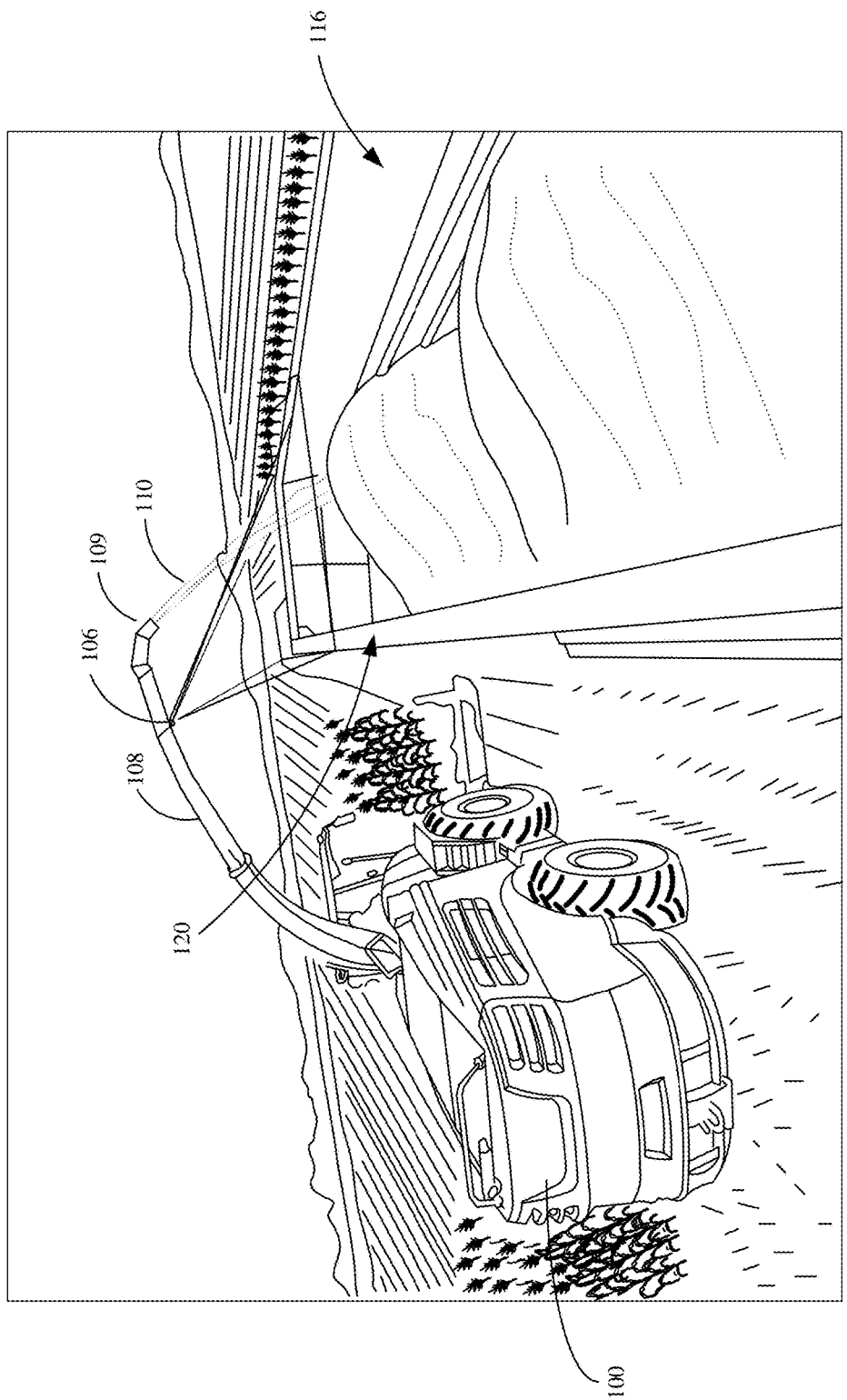
FIG. 2 is a pictorial illustration of one example of a forage harvester filling a receiving vehicle that is alongside the forage harvester.

FIG. 2 is a pictorial illustration showing another example of a self-propelled forage harvester 100, this time loading a semi-trailer (or receiving vehicle) 116 in a configuration in which a semitractor is pulling semi-trailer 116 alongside forage harvester 100. Therefore, the spout 108 and flap 109 are positioned to unload the harvested material 110 to fill trailer 116 according to a pre-defined side-by-side fill strategy. Again, FIG. 2 shows that camera 106 can capture an image of semi-trailer 116. In the example illustrated in FIG. 2, the field of view of camera 106 is directed toward the receiving area of trailer 116 so that image processing can be performed to identify the height of the material 110 in trailer 116, and to identify the position of the material along the elongate axis of trailer 116 (e.g., along the front-to-back axis). In this way, the automatic cart filling control system can control the position of spout 108 and flap 109 to direct the material 110 into trailer 116 according to a strategy that provides a relatively even fill, without over filling trailer 116.

Also, in the example shown in FIG. 2, it can be seen that camera 106 can be positioned to have a field of view that captures an image of the side portion 120 of trailer 116. Thus, the visual or optical features of the side portion of trailer 116 can be used to uniquely identify trailer 116, or at least to identify the type of the trailer 116. Based on the unique trailer identifier or the type identifier, the settings values for the automatic cart filling control system can be obtained so that the cart is filled in a cart-specific way or in a cart type-specific way, depending upon whether the cart is uniquely identified or the cart type is identified.

Figure 3:
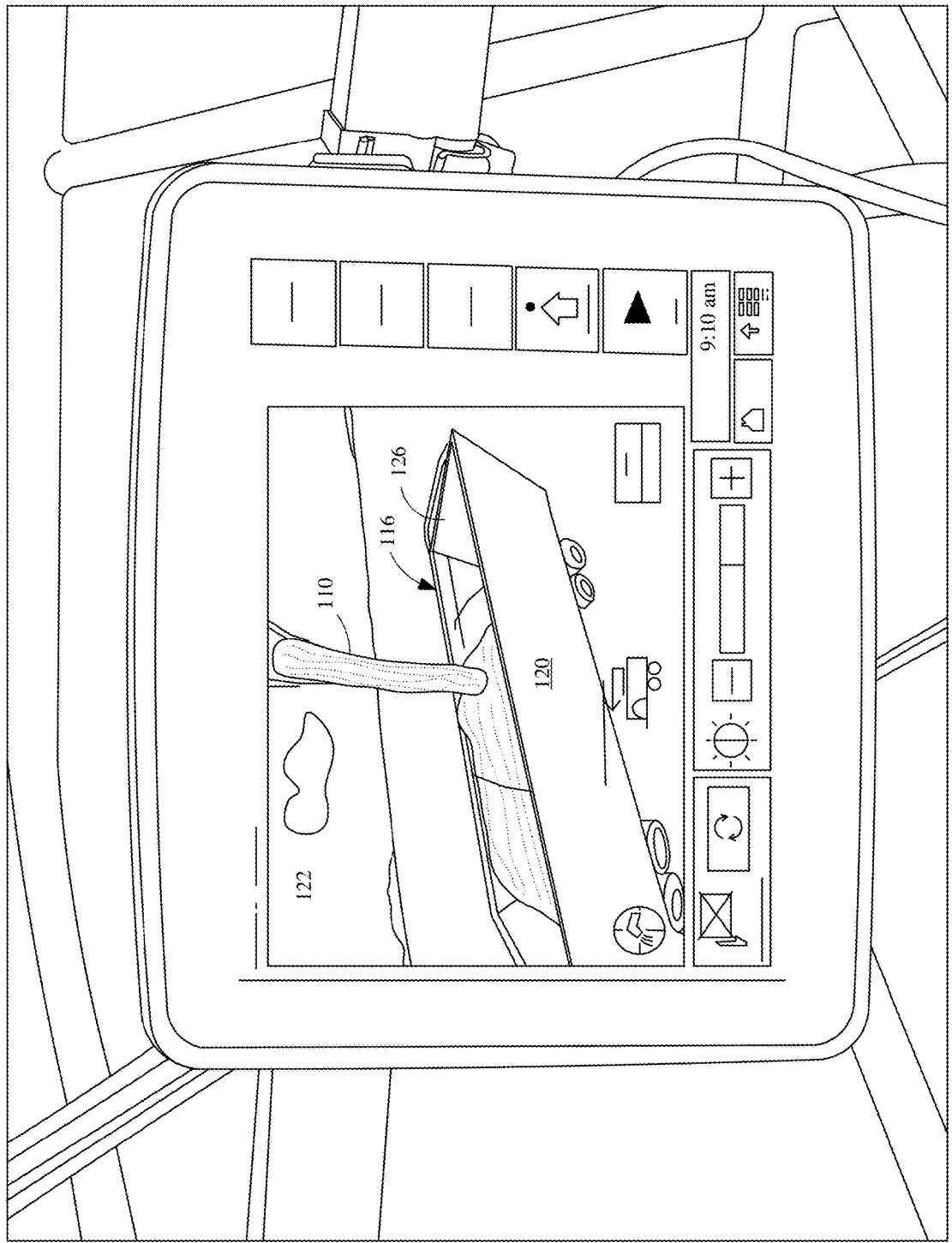
FIG. 3 is a pictorial illustration of one example of a user interface display that can be generated by an automatic fill control system, for an operator of a forage harvester.

FIG. 3 is a pictorial illustration showing one example of a user interface display 122 that can be displayed on a display mechanism 124, for the operator in an operator compartment of forage harvester 100. The user interface display 122 in FIG. 3 shows a view of images captured by camera 106 of material 110 entering trailer 116. The image processing system in the automatic cart filling control system illustratively identifies the perimeter of the opening 126 in trailer 116 and also processes the image of the material 110 in trailer 116 to determine its fill height relative to opening 126. It can also be seen that camera 106 can easily capture an image of the side portion 120 of trailer 116 so that visual or optical features of the side portion 120 of trailer 116 can be used to uniquely identify the trailer or the trailer type.

Figure 4:
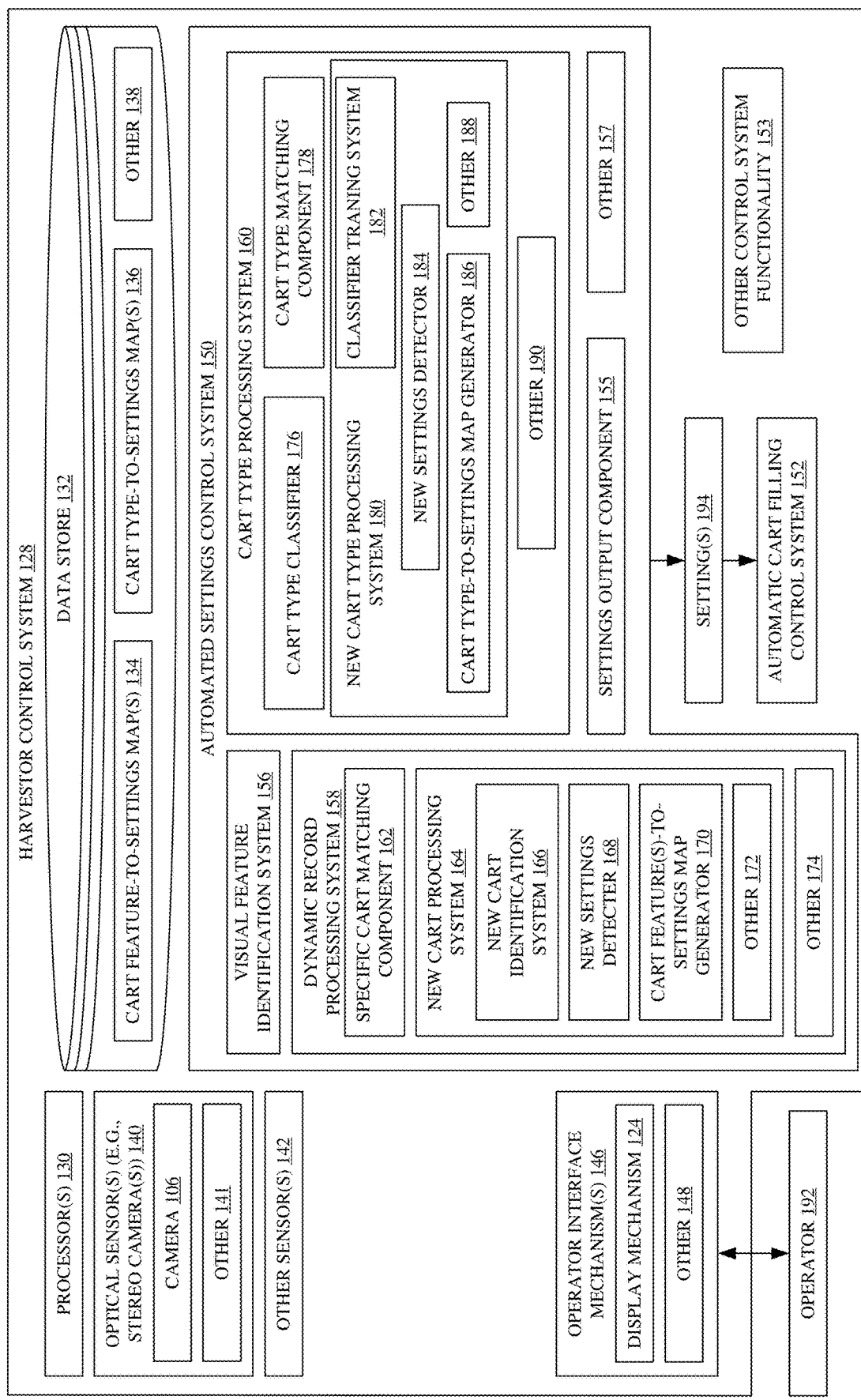
FIG. 4 is a block diagram of one example of a harvester control system.

FIG. 4 is a block diagram showing one example of a harvester control system 128. It is assumed for the sake of the following description that the receiving vehicle is a cart, such as cart 102. However, this is just an example and the description could just as easily proceed with respect to the receiving vehicle being a semitrailer or other receiving vehicle. Also, it should be noted that any or all of system 128 can be located at a remote location, such as in the cloud or elsewhere. It is shown on harvester 100 for the sake of example only.

Harvester control system 128 illustratively includes one or more processors 130, data store 132 (which can include cart feature-to-settings maps 134, cart type-to-settings maps 136 and/or other items 138), one or more optical sensors (such as stereo cameras) 140, one or more other sensors 142, operator interface mechanisms 146 (which can include display mechanism 124 and a wide variety of other items 148), automated settings control system 150, automatic cart filling control system 152, and it can include a wide variety of other control system functionality 153. Automated settings control system 150 can include visual feature identifications system 156, dynamic record processing system 158, cart type processing system 160, settings output component 155, and it can include a wide variety of other items 157. Dynamic record processing system 158 illustratively includes specific cart matching component 162, and new cart processing system 164 (which, itself, includes new cart identification system 166, new settings detector 168, cart features-to-settings map generator 170, and it can include other items 172). Dynamic record processing system 158 can also include other items 174.

Cart type processing system 160 can include cart type classifier 176, cart type matching component 178, and cart type processing system 180 (which, itself, can include classifier training system 182, new settings detector 184, cart type-to-settings map generator 186, and other items 188). Cart type processing system 160 can include other items 190 as well. Before describing the overall operation of control system 128, a brief description of some of the items in control system 128, and their operation, will first be provided.

Optical sensors 140 can include camera 106, and other optical sensors 141. Camera 106 can be a stereo camera system or other video capture system.

Operator interface mechanisms 146 can include display mechanism 124 (described above with respect to FIG. 3) and a wide variety of other operator interface mechanisms 148. Such mechanisms can include a steering wheel, joysticks, levers, buttons, linkages, pedals, a touch sensitive display screen, a microphone and speaker (where speech recognition and speech synthesis are provided), among a wide variety of other audio, visual, and haptic mechanisms. Operator 192 illustratively interacts with operator interface mechanisms 146 in order to control and manipulate harvester control system 128 and harvester 100.

Automatic cart filling control system 152 illustratively controls the fill operation for a receiving vehicle (such as tractor-towed grain cart 102 or semi-trailer 116). It controls various controllable features, such as the fill strategy (e.g., front to back, back to front, etc.), offsets, fill level, percent fill, etc. System 152 controls those portions of the filling operation based upon a set of settings 194 that it receives. In some cases, operator 192 can manipulate operator interface mechanisms 146 to provide settings 194. In other cases, automated settings control system 150 identifies the particular receiving vehicle that is being filled (based upon its visual or optic features captured by sensors 140) or it identifies the type of receiving vehicle that is being filled, based upon those same features. If this particular cart (or cart type) has been seen before, then automated settings control system 150 accesses the cart feature-to-settings maps 134 or the cart type-to settings maps 136 and obtains setting values based upon the particular cart or cart type. It then outputs those settings values as settings 194 to automatic cart filling control system 152. The setting values can indicate a variety of different things, such as the desired fill strategy, the desired fill height, offset distances, etc. The operation of automated settings control system 150 will now be described in more detail.

Visual feature identification system 156 obtains the optical image or images from sensors 140, showing a portion of the receiving vehicle (e.g., grain cart 102 or semi-trailer 116). For instance, it may obtain an image of the side of the receiving vehicle, the front panel of the receiving vehicle, etc. Visual feature identification system 156 then identifies visual or optical features corresponding to the trailer. Dynamic record processing system 158 processes those features in a system where the particular carts are uniquely identified so that a dynamic set of cart feature-to-settings maps 134 is maintained and accessed to obtain settings 194. Cart type processing system 160 processes the visual or optical features where the settings are to be identified based upon the cart type, instead of based upon the uniquely identified cart, itself.

Assume, for purposes of the present description, that a dynamic set of cart feature-to-settings maps 134 is to be maintained so that uniquely identified carts (identified based upon their visual or optical features or characteristics) have their own mappings that map the features (or a unique cart identifier corresponding to the identity of the cart) to a set of settings that will be output as settings 194 when that cart is being filled. In that case, specific cart matching component 162 accesses maps 134 and attempts to match the visual or optical features identified by identification system 156 against the features in the feature-to-settings maps 134. When a match is obtained, the settings in that map are extracted and provided to settings output component 155 which outputs the settings, as settings 194, to automatic cart filling control system 152.

Where this particular cart has not been seen before by control system 150, so that no maps 134 match it, then new cart processing system 164 generates a map 134 for this new cart. New cart identification system 166 identifies that the cart is new, and controls operator interface mechanisms 146 to surface (e.g., display) a notice to operator 192 that this is a new cart, and that settings values are needed for the new cart. New settings detector 168 then detects operator interaction with the operator interface mechanisms 146, inputting the new settings that are to be used for filling this particular cart. Cart features-to-settings map generator 170 then generates a map 134 that maps the cart identifier (e.g., a unique identifier, or the optical or visual features corresponding to this cart, etc.) to the settings that were just input by operator 192. Those settings are also provided to settings output component 155 which provides them, as settings 194, to automatic cart filling control system 152. System 152 then commences filling the cart according to a fill operation/ strategy based on the settings 194 that it has received.

When the cart settings are to be retrieved based upon cart type (instead of based on the identity of the unique cart, itself), then the visual features or characteristics (or the image itself) are provided from visual feature identification system 156 to cart type processing system 160. Cart type classifier 176 receives the visual or optic features (or the optical image or set of images itself) and provides them to a classifier, such as a deep neural network, a Bayesian classifier, or another type of classifier which provides, at its output, a cart type classification that indicates the type of cart that is represented by the captured images.

Cart type matching component 178 then accesses cart type-to-settings maps 136 and attempts to match the cart type identified by classifier 176 to the cart type in the maps 136. If a match is found, then the settings portion of the matching map 136 is obtained and provided to settings output component 155. Those settings are provided as settings 194 that are used by automatic cart filling control system 152 in automatically filling this particular cart.

When cart type matching component 178 is unable to find a matching map 136 (meaning that this particular cart type has not been seen before by the system) (then new cart type processing system 180 surfaces an output on user interface mechanisms 146 notifying operator 192 that the operator needs to input settings for this particular cart type. New settings detector 184 detects the new settings input by the operator 192 and cart type-to-settings map generator 186 generates a new cart type-to-settings map 136 for this type of cart. Thus, the next time this type of cart is identified, that new map 136 can be accessed to obtain the settings. In addition, classifier training system 182 trains cart type classifier 176, based upon the newly identified cart type, and the images or optical features or characteristics of the cart, so that it is more likely to properly classify this cart type when this type of cart is seen again (as represented in the optical images that are received).

Figure 5A:
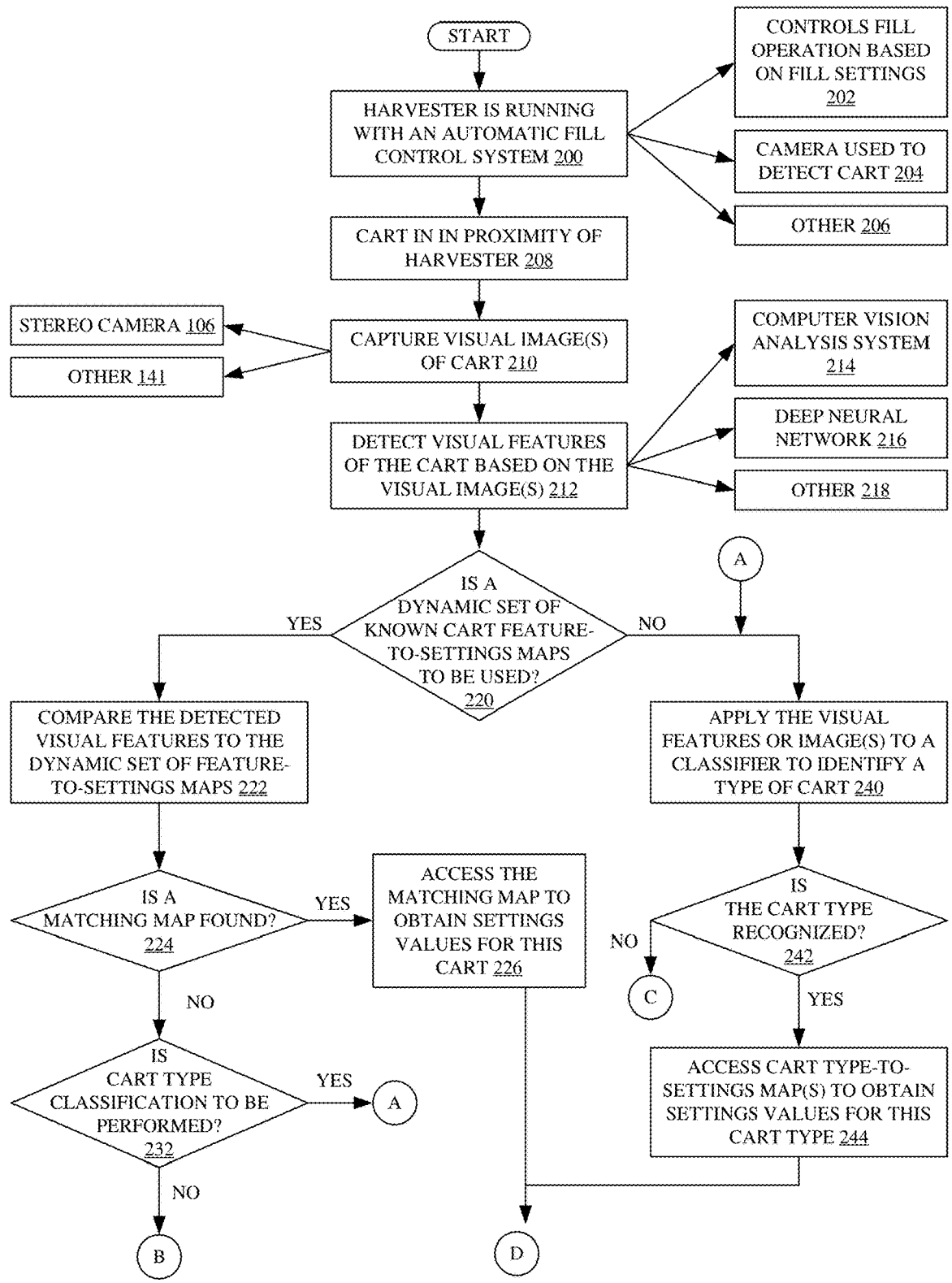
FIGS. 5A and 5B (collectively referred to herein as FIG. 5) show a flow diagram illustrating one example of the operation of the harvester control system shown in FIG. 4, in identifying automatic fill control settings based on a visual image of a receiving vehicle.
Figure 5B:
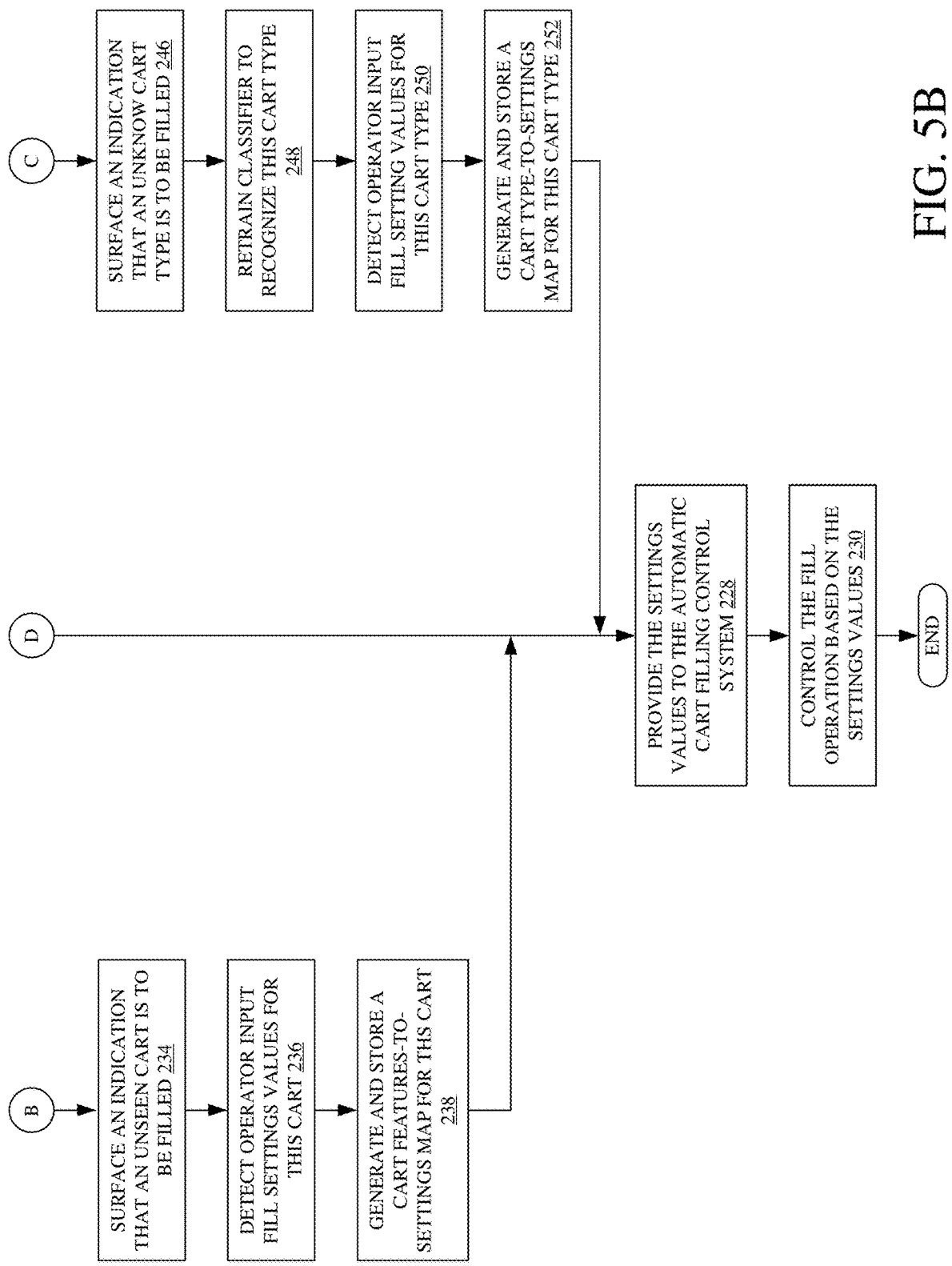

FIGS. 5A and 5B (collectively referred to herein as FIG. 5) show a flow chart illustrating one example of the operation of harvester control system 128, in more detail. The present description with respect to FIG. 5 continues assuming that a tractor-towed grain cart 102 is used as the receiving vehicle. It will be appreciated, though, that other receiving vehicles can be used as well.

It is first assumed that harvester 100 is running with an automatic cart filling control system 152. This is indicated by block 200 in the flow diagram of FIG. 5. The control system 152 controls the fill operation, automatically, based upon fill settings 194. This is indicated by block 202. It is also assumed that harvester 100 has a camera or other sensor 140 that is used to detect visual or optic characteristics of the cart or other receiving vehicle. This is indicated by block 204. The harvester can be running in other ways as well, and be equipped with other sensors and systems. This is indicated by block 206.

At some point, a proximity sensor can sense that the cart 102 is in proximity of harvester 100. This is indicated by block 208 in the flow diagram of FIG. 5. It may be, for example, that an optical sensor, a RADAR or LIDAR sensor, or another type of sensor senses that the grain cart 102 is in close proximity to harvester 100. In another example, it may be that the operator identifies this by observation.

Once in position to be filled, then optical sensors 140 capture one or more visual images, or videos, of the cart 102. This is indicated by block 210. Again, the sensors 140 can include stereo camera 106, or other sensors 141.

In one example, visual feature identification system 156 then identifies the visual features of the cart based upon the visual images that are captured. This is indicated by block 212. The visual features can be detected using computer vision analysis system 214, using a deep neural network 216, or using other image processing techniques and mechanisms for identifying visual features or characteristics in an image, a set of images, or a video. This is indicated by block 218.

The processing that takes place next depends on whether dynamic record processing system 158 or cart type processing system 160 is to be used. Recall, again, that dynamic record processing system 158 uniquely identifies individual carts and accesses settings for those specific carts. Cart type processing system 160 identifies the type of the cart, and accesses settings based upon the type of the cart to be used and not necessarily based on the uniquely identified cart, itself. Thus, at block 220, it is determined whether the set of dynamic, known cart feature-to-settings maps are to be used or not.

If so, processing continues at block 222, where specific cart matching component 162 compares the detected visual features of the received images to the dynamic set of feature-to-settings maps 134 in data store 132. If a match is found (meaning that the visual or optical features match the feature side of one of the mappings 134) then component 162 accesses the settings in the matching map 134 and provides those settings to output component 155, which outputs them as settings 194 to automatic cart filling control system 152. Determining whether a match is found is indicated by block 224, and accessing the matching map to obtain the settings value for this specific cart is indicated by block 226. Providing the settings values to the automatic cart filling control system 152 is indicated by block 228. Automatic cart filling control system 152 then controls the fill operation based upon the settings values. This is indicated by block 230.

If, at block 224, it is determined that no matching map 134 is found, then dynamic record processing system 158 determines whether cart type processing is to be performed. By way of example, it will now be known that this specific cart has not, itself, been seen by the system 150 before. However, it may be that a cart of the same type (although not this identical cart) may have been seen before. The cart type may be based on make and model of cart, cart dimensions, cart configuration, and/or on other criteria. Thus, it may be that the operator 192 wishes system 150 to first check for this identical cart, and then, if it has not been seen before, check for a similar type of cart so that the settings for the same type of cart can be recommended to the operator 192, or automatically used. Determining whether cart type processing is to be performed is indicated by block 232 in the flow diagram of FIG. 5.

Assume, for the sake of the present discussion, that cart type processing is not to be performed. In that case, new cart identification system 166 surfaces a notification to operator 192 that this is a new cart, which has not yet been seen by system 150. Surfacing the indication that an unseen cart is to be filled is indicated by block 234 in the flow diagram of FIG. 5.

In one example, new settings detector 168 also surfaces a user interface mechanism that allows operator 192 to enter new settings values that are to be used by system 152 in conducting the fill operation corresponding to this particular cart. New settings detector 168 then detects those settings, input by operator 192. This is indicated by block 236. The settings are provided to cart features-to-settings map generator 170 which generates a new map 134 that maps this particular cart (as identified by its visual or optic features) to the settings values that were just entered by the operator. Generating the new map 134 for this cart is indicated by block 238. Again, the settings values are then provided to automatic cart filling control system 152 which controls the cart filling operation based upon the settings values input by operator 192. This is indicated by blocks 228 and 230, respectively, in FIG. 5.

Now, assume that, at either block 232, or at block 220, it is determined that system 150 is configured such that cart type processing system 160 is to be invoked in order to perform cart type processing. Cart type classifier 176 first receives the visual or optical features from system 156 (or the images themselves) and applies them to cart type classifier 176. Cart type classifier 176 then attempts to classify the features or images to identify a particular type of cart that they belong to. This is indicated by block 240 in the flow diagram of FIG. 5. It will be noted that classifier 176 may provide a cart type indicator (that identifies cart type) and a confidence indicator (that indicates how confident classifier 176 is in the cart type indicator).

Once the type of cart is identified by classifier 176, cart type matching component 178 then accesses the cart type-to-settings map 136 to see if there is a map 136 for a matching cart type. If so, component 178 accesses the matching map 136 and obtains the settings values from the matching map 136 and provides them to settings output component 155. Settings output component 155 outputs the settings 194 to automatic cart filling control system 152, which then controls the fill operation based on those settings values. Determining whether the cart type has a matching mapping 136 is indicated by block 242 in the flow diagram of FIG. 5. Accessing the matching mapping to obtain the settings values for the corresponding cart type is indicated by block 244. Providing those values to control system 152 and controlling the filling operation based on those settings values is indicated by blocks 228 and 230, respectively.

Returning again to block 242, if the cart type identifier has a low confidence level, or if cart type matching component 178 does not find a matching map 136, then it provides an indication of this to new cart type processing system 180. In response, system 180 surfaces an indication to operator 192, indicating that an unknown cart type is about to be filled. This is indicated by block 246 in the flow diagram of FIG. 5. Classifier training system 182 also trains cart type classifier 176 to classify the features corresponding to the present cart, into a new class type so that, if a similar cart type is seen in the future, classifier 176 can identify that cart type. Retraining the classifier 176 to recognize this cart type is indicated by block 248 in the flow diagram of FIG. 5. Training system 182 can be a machine learning system or another type of classifier training system.

New settings detector 184 detects the operator inputs from operator 192, indicating the new settings values for this particular cart type. This is indicated by block 250. It provides those settings values to settings output component 155 which outputs them as settings 194 to automatic cart filling control system 152. Cart type-to-settings map generator 186 also generates a cart type-to-settings map 136 for this particular cart type. The new map maps the cart type identifier (or the cart's optical features or characteristics) to the settings values that were just input by operator 192 for this particular cart type. Generating and storing a cart type-to-settings map 136 for this cart type is indicated by block 252.

It should also be noted that if classifier 176 needs to be retrained, this can be indicated in a number of different ways. For example, classifier 176 can output results with low confidence, or an output that indicates there is no matching cart type class. These may indicate that classifier 176 needs to be retrained.

It can thus be seen that the present description has proceeded with respect to a system that can automatically identify individual carts, or cart types without using fiducial markers. Based on the identity of the carts or cart types, the system can identify settings values that can be used by an automatic cart filling control system to control the filling operation according to a pre-defined strategy corresponding to that cart or cart type. This can all be done substantially without any operator involvement or interaction with the system. When a new cart or cart type is seen, the operator is notified, and the settings values can be input and a new map generated for the new cart or cart type. Thus, when that cart or cart type is seen again in the future, the settings values can again be automatically obtained and used to control the filling operation.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
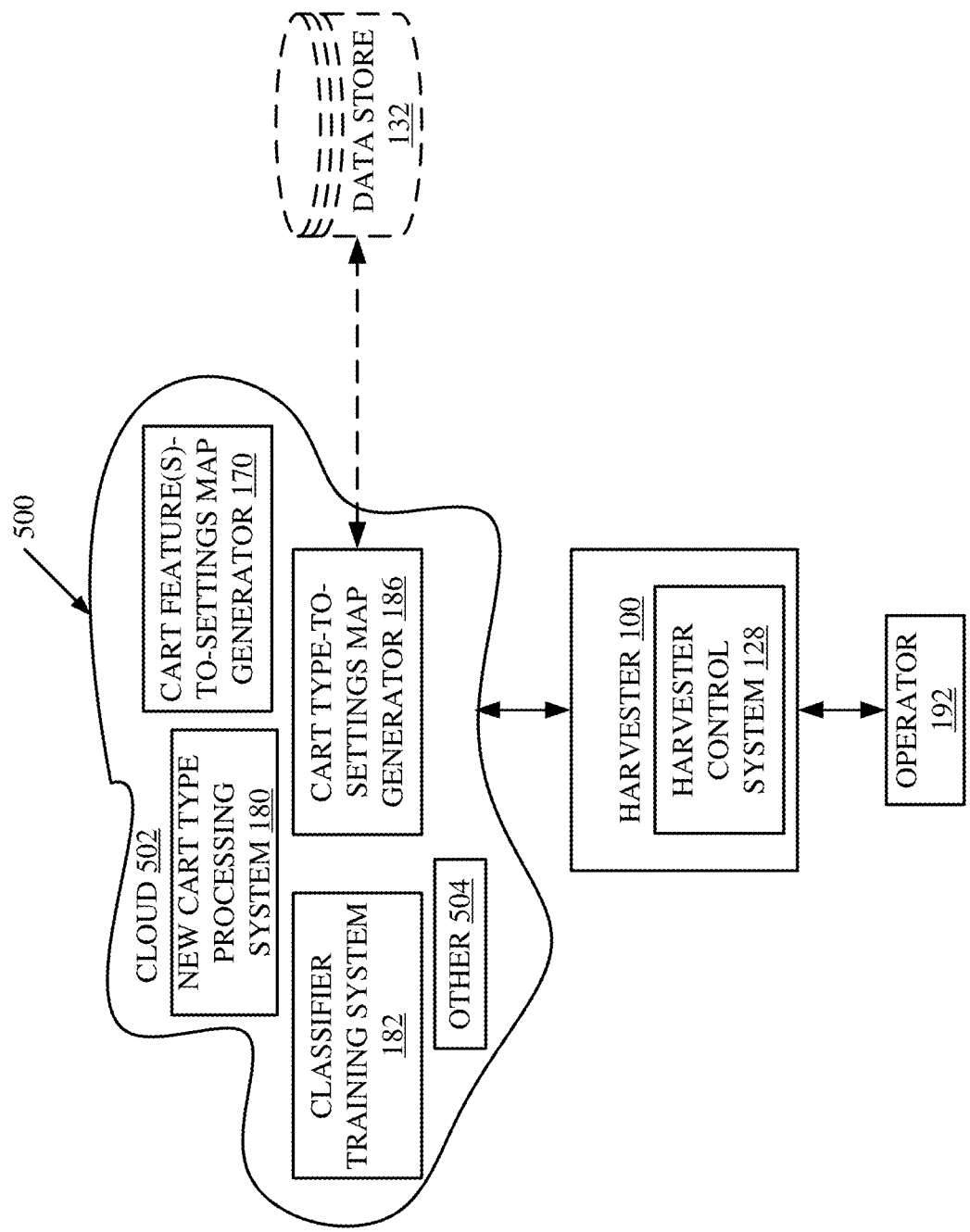
FIG. 6 is a block diagram showing one example of the harvester control system deployed in a remote server architecture.

FIG. 6 is a block diagram of harvester 100, shown in FIG. 1, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 6, some items are similar to those shown in FIG. 4 and they are similarly numbered. FIG. 6 specifically shows that new cart type processing system 180, classifier training system 182, map generators 170 and 186 and data store 132 (or other items 504) can be located at a remote server location 502. Therefore, harvester 100 accesses those systems through remote server location 502.

FIG. 6 also depicts another example of a remote server architecture. FIG. 6 shows that it is also contemplated that some elements of FIG. 4 can be disposed at remote server location 502 while others are not. By way of example, data store 132 or other items can be disposed at a location separate from location 502, and accessed through the remote server at location 502. Regardless of where they are located, they can be accessed directly by harvester 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. All of these architectures are contemplated herein.

It will also be noted that the elements of FIG. 4, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
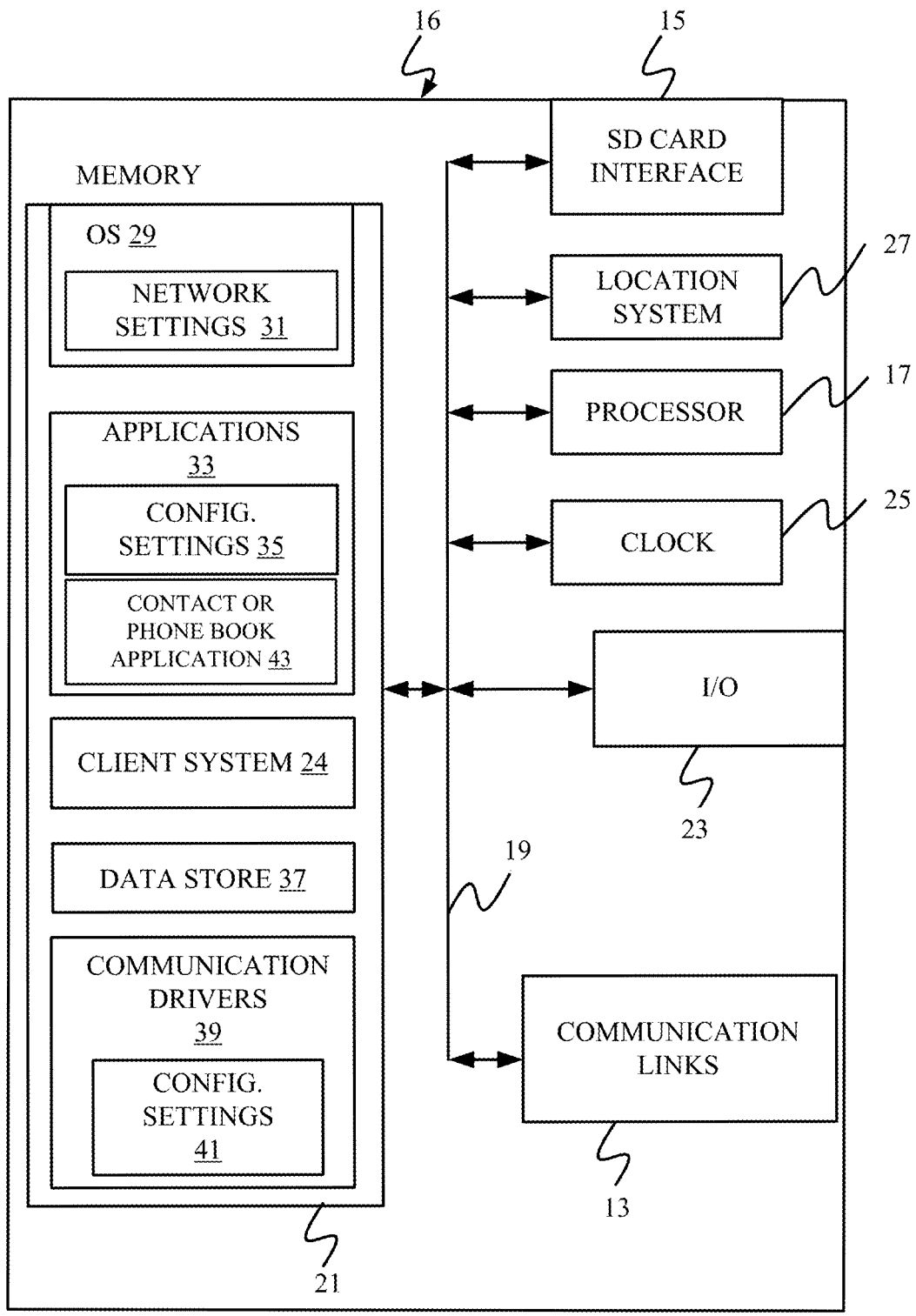
FIGS. 7-9 show examples of mobile devices that can be used in the machines described in previous figures.
Figure 8:
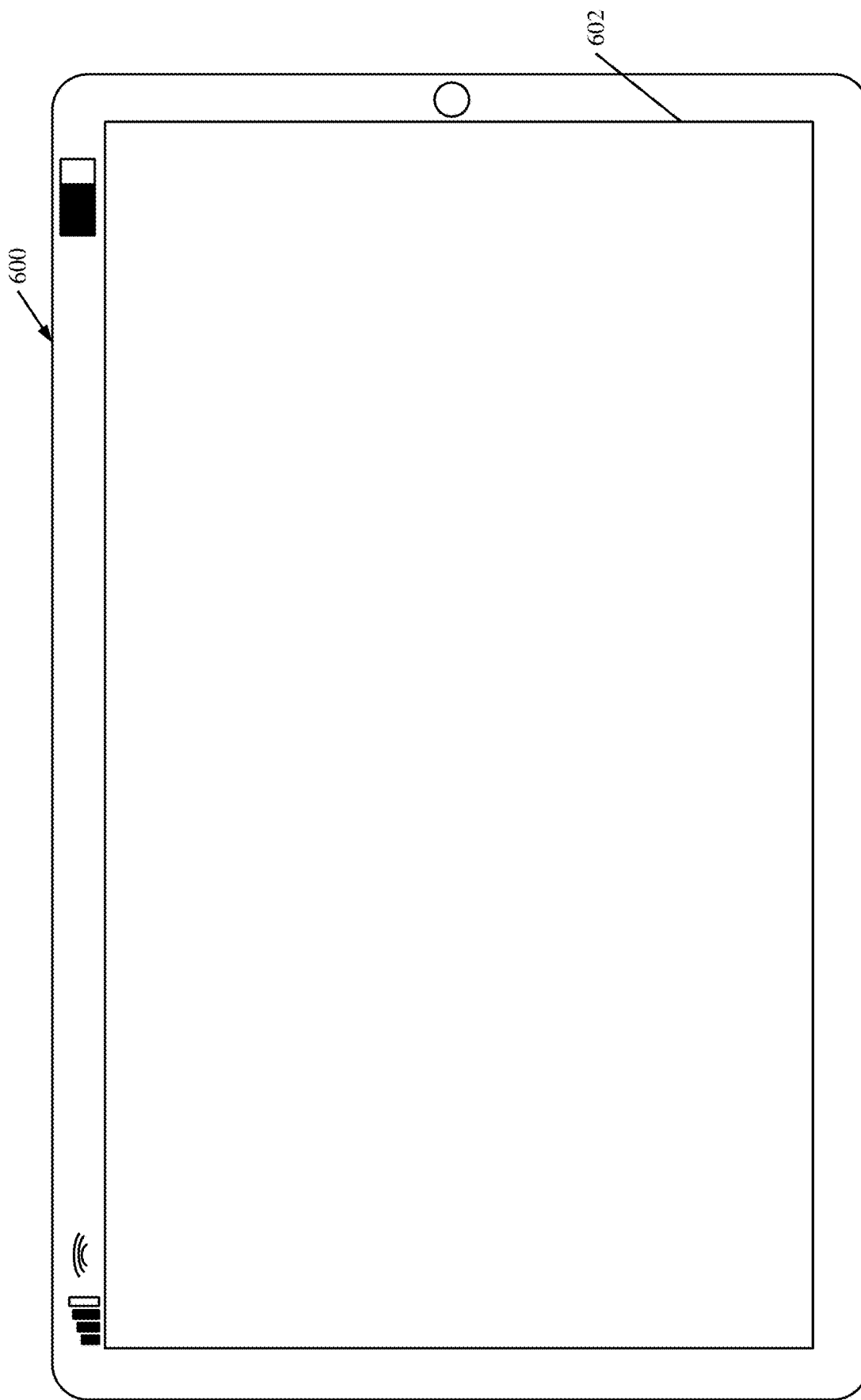
Figure 9:
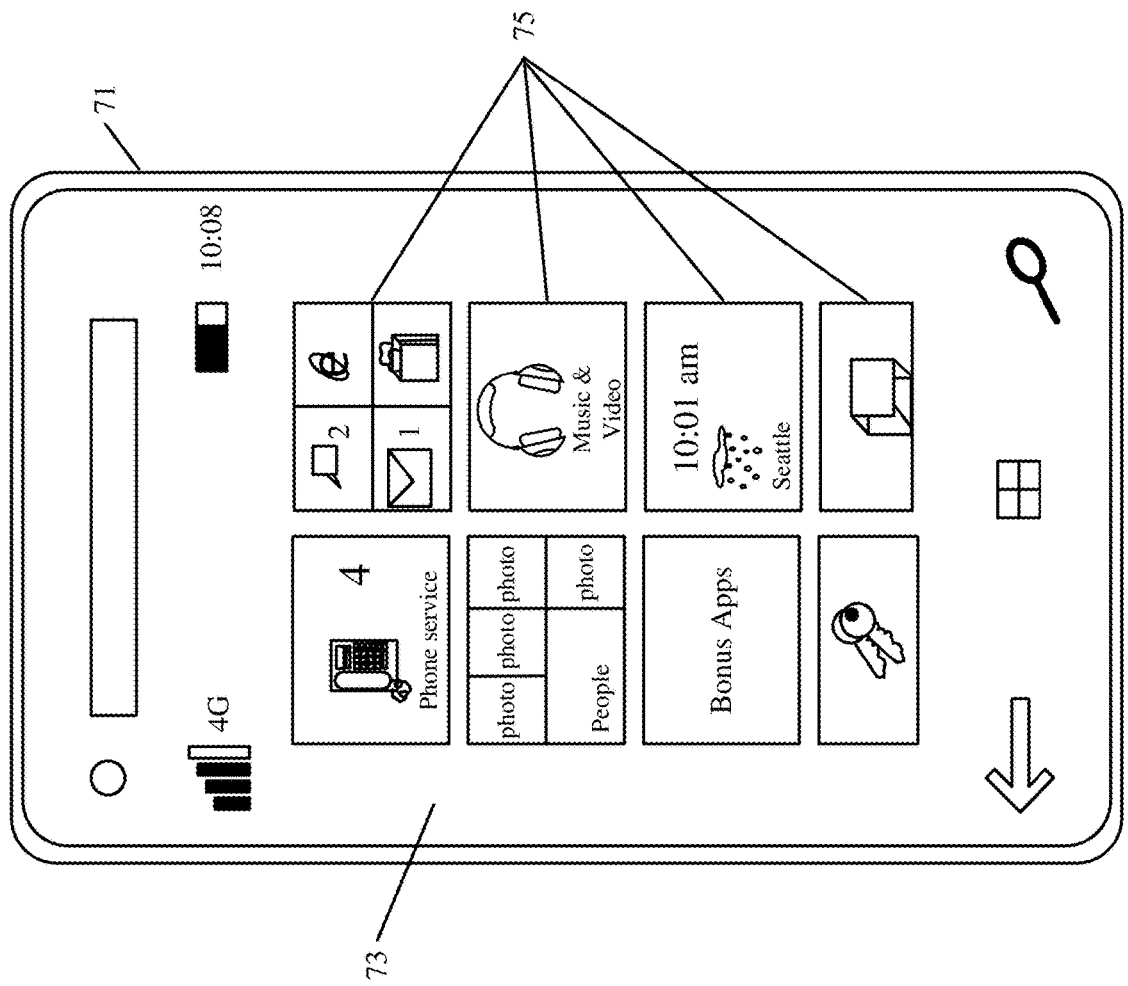

FIG. 7 is a simplified block diagram of one illustrative example of a handheld or mobile computing device that can be used as a user's or client's hand held device 16, in which the present system (or parts of it) can be deployed. For instance, a mobile device can be deployed in the operator compartment of harvester 100 for use in generating, processing, or displaying the images from camera 106, the settings are actuators, etc. FIGS. 8-9 are examples of handheld or mobile devices.

FIG. 7 provides a general block diagram of the components of a client device 16 that can run some components shown in FIG. 4, that interacts with them, or both. In the device 16, a communications link 13 is provided that allows the handheld device to communicate with other computing devices and in some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, contact or phone book application 43, client system 24, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 8 shows one example in which device 16 is a tablet computer 600. In FIG. 8, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 9 shows that a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
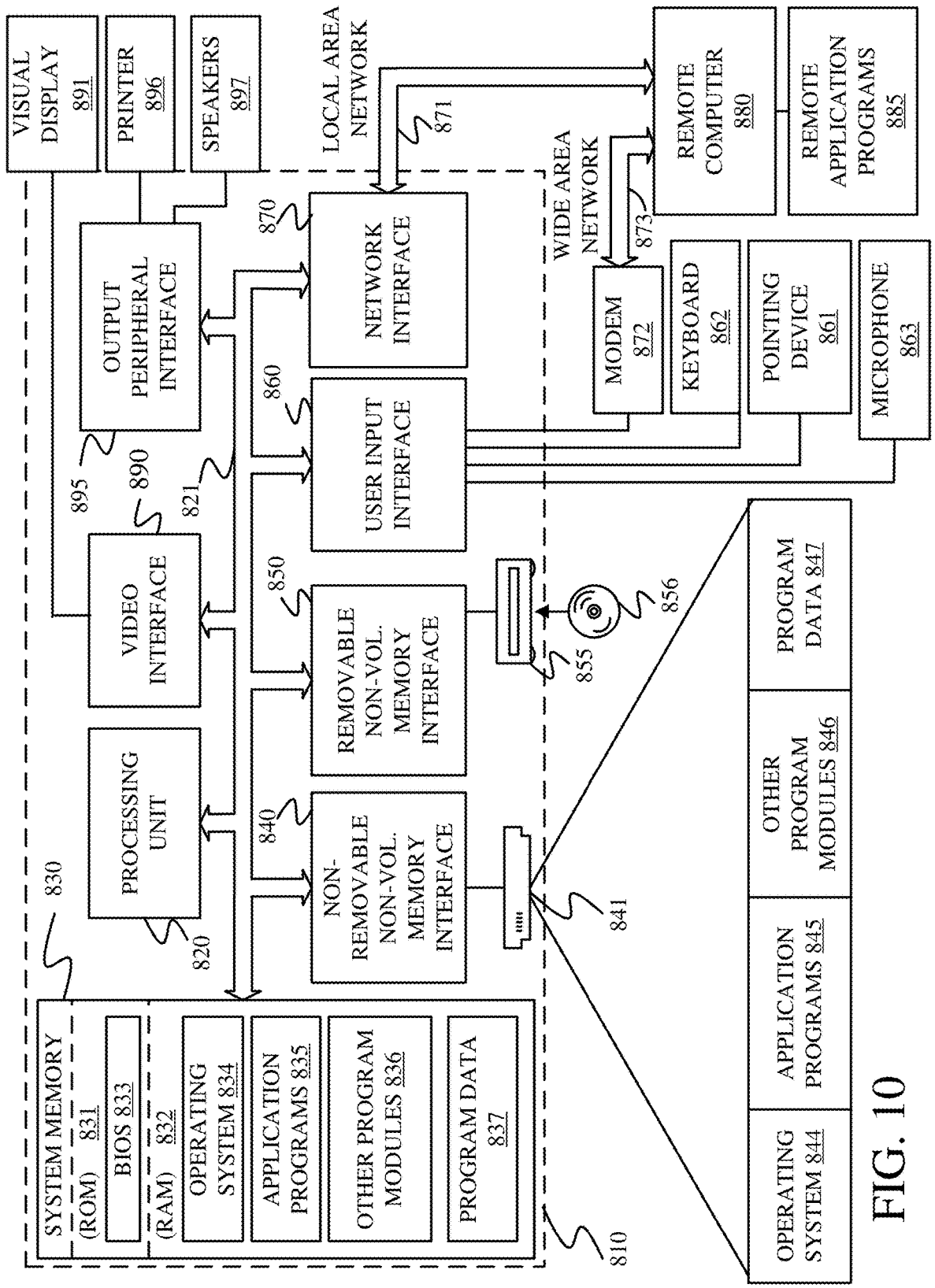
FIG. 10 is a block diagram showing one example of a computing environment that can be used in the machines and systems described with respect to previous figures.

FIG. 10 is one example of a computing environment in which elements of FIG. 4, or parts of it, (for example) can be deployed. With reference to FIG. 10, an example system for implementing some embodiments includes a general-purpose computing device in the form of a computer 810 programmed to operate as discussed above. Components of computer 810 may include, but are not limited to, a processing unit 820 (which can comprise processors from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 4 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 10 illustrates, for example, that remote application programs 885 can reside on remote computer 880.

It should also be noted that the different example described herein can be combined in different ways. That is, parts of one or more examples can be combined with parts of one or more other examples. All of this is contemplated herein.

Example 1 is a harvester control system that controls a harvester to load a receiving vehicle with harvested material, comprising:

an optical sensor that generates an image of a portion of the receiving vehicle;

an automated settings control system that identifies an optical characteristic of the receiving vehicle based on the image of the portion of the receiving vehicle and that identifies fill settings corresponding to the optical characteristic of the receiving vehicle;

a settings output component that outputs the fill settings; and an automatic cart filling control system that automatically controls a position of a spout on the harvester during a filling operation, during which the harvester fills the receiving vehicle with the harvested material, based on the fill settings.

Example 2 is the harvester control system of any or all previous examples wherein the optical characteristic comprises an optical feature of the portion of the receiving vehicle and wherein the automated settings control system comprises:

a specific cart matching component that accesses a set of feature-to-settings maps, each feature-to-settings map mapping optical features to settings values, to identify a matching map that has optical features that match the optical feature identified from the corresponding portion of the receiving vehicle.

Example 3 is the harvester control system of any or all previous examples wherein the specific cart matching component is configured to, if a matching map is identified, obtain the settings values from the matching map and provide the settings values obtained from the matching map to the settings output component.

Example 4 is the harvester control system of any or all previous examples and further comprising:

a new cart processing system configured to, if no matching map is identified, detect operator input settings values corresponding to the receiving vehicle and generate a feature-to-settings map that maps the optical feature of the receiving vehicle to the operator input settings values and provide the operator input settings values to the settings output component.

Example 5 is the harvester control system of any or all previous examples wherein the new cart processing system comprises:

a new cart identification system that generates an operator interface indicator identifying the receiving vehicle as a new receiving vehicle for which no matching feature-to-settings map is found;

a new settings detector that detects the operator input settings values corresponding to the new receiving vehicle; and a feature-to-settings map generator that generates the feature-to-settings map corresponding to the new receiving vehicle.

Example 6 is the harvester control system of any or all previous examples wherein the automated settings control system comprises:

a cart type classifier that identifies a cart type, indicative of a type of the receiving vehicle, based on the optical characteristic of the receiving vehicle.

Example 7 is the harvester control system of any or all previous examples wherein the automated settings control system comprises:

a cart type matching component that accesses a set of cart type-to-settings maps, each cart type-to-settings map mapping a cart type value to a set of settings values, to identify a matching map that has a cart type value that matches the cart type of the receiving vehicle identified by the cart type classifier.

Example 8 is the harvester control system of any or all previous examples wherein the cart type matching component is configured to, if a matching map is identified, obtain the set of settings values from the matching map and provide the settings values obtained from the matching map to the settings output component.

Example 9 is the harvester control system of any or all previous examples wherein the automated settings control system comprises:

a new cart type processing system that generates an operator interface indicator identifying the receiving vehicle as being of a new receiving vehicle type for which no matching cart type-to-settings map is found;

a new settings detector that detects operator input settings values corresponding to the new receiving vehicle type; and a cart type-to-settings map generator that generates a cart type-to-settings map corresponding to the new receiving vehicle.

Example 10 is the harvester control system of any or all previous examples wherein the new cart type processing system comprises:

a classifier training system that trains the cart type classifier to recognize carts having the cart type of the receiving vehicle.

Example 11 is a computer implemented method of controlling a harvester to fill a receiving vehicle with harvested material, the computer implemented method comprising:

generating an image of a portion of a receiving vehicle;

identifying an optical characteristic of the receiving vehicle based on the image of the portion of the receiving vehicle;

obtaining fill settings corresponding to the optical characteristic of the receiving vehicle; and automatically controlling a position of a spout on the harvester during a filling operation, during which the harvester fills the receiving vehicle with harvested material, based on the fill settings.

Example 12 is the computer implemented method of any or all previous examples wherein identifying an optical characteristic comprises identifying an optical feature of the portion of the receiving vehicle and wherein obtaining fill settings comprises:

accessing a set of feature-to-settings maps, each feature-to-settings map mapping optical features to settings values; and identifying a feature-to-settings map as a matching map if the feature-to-settings map has optical features that match the optical feature identified from the corresponding portion of the receiving vehicle.

Example 13 is the computer implemented method of any or all previous examples and further comprising:

if a matching map is identified, obtaining the settings values from the matching map as the fill settings.

Example 14 is the computer implemented method of any or all previous examples and further comprising:

if no matching map is identified, detecting operator input settings values corresponding to the receiving vehicle; and generating a feature-to-settings map that maps the optical feature of the receiving vehicle to the operator input settings values; and using the operator input settings values as the fill settings.

Example 15 is the computer implemented method of any or all previous examples wherein generating a feature-to-settings map comprises:

generating an operator interface indicator identifying the receiving vehicle as a new receiving vehicle for which no matching feature-to-settings map is found;

detecting the operator input settings values corresponding to the new receiving vehicle; and generating the feature-to-settings map corresponding to the new receiving vehicle.

Example 16 is the computer implemented method of any or all previous examples wherein obtaining fill settings comprises:

applying the optical characteristic of the receiving vehicle to a classifier to identify a cart type, indicative of a type of the receiving vehicle; and accesses a set of cart type-to-settings maps, each cart type-to-settings map mapping a cart type value to a set of settings values, to identify a matching map that has a cart type value that matches the cart type of the receiving vehicle identified by the classifier.

Example 17 is the computer implemented method of any or all previous examples wherein obtaining the fill settings comprises:

if a matching map is identified, obtaining the set of settings values from the matching map.

Example 18 is the computer implemented method of any or all previous examples wherein obtaining the fill settings comprises:

if no matching cart type-to-settings map is found, generating an operator interface indicator identifying the receiving vehicle as being of a new receiving vehicle type;

detecting operator input settings values corresponding to the new receiving vehicle type; and generating a cart type-to-settings map corresponding to the new receiving vehicle.

Example 19 is the computer implemented method of any or all previous examples and further comprising:

if no matching cart type-to-settings value is found, training the classifier to recognize carts having the cart type of the receiving vehicle.

Example 20 is a computer implemented method of controlling a harvester to fill a receiving vehicle with harvested material, the computer implemented method comprising:

generating an image of a portion of a receiving vehicle;

identifying an optical characteristic of the receiving vehicle based on the image of the portion of the receiving vehicle;

determining whether cart-specific fill settings are identifiable based on the optical characteristic;

if so, obtaining the cart-specific fill settings as selected fill settings;

if cart-specific fill settings are not identifiable, then determining whether cart type-specific fill settings are identifiable based on the optical characteristic;

if cart type-specific fill settings are identifiable, then obtaining the cart type-specific fill settings as the selected fill settings;

if cart type-specific fill settings are not identifiable, then obtaining operator input fill settings as the selected fill settings; and automatically controlling a position of a spout on the harvester during a filling operation, during which the harvester fills the receiving vehicle with harvested material, based on the selected fill settings.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A harvester control system that controls a harvester to load a receiving vehicle with harvested material, the harvester control system comprising:

an optical sensor that generates an image of a portion of the receiving vehicle;

an automated settings control system that:

identifies an optical characteristic of the receiving vehicle based on the image of the portion of the receiving vehicle;

searches, based on the optical characteristic, a data store to identify a map, the map including fill settings; and identifies fill settings based on the identified map; and a settings output component that outputs the fill settings; and an automatic cart filling control system that automatically controls a position of a spout on the harvester during a filling operation, during which the harvester fills the receiving vehicle with the harvested material, based on the fill settings.

2. The harvester control system of claim 1, wherein the optical characteristic comprises an optical feature of the portion of the receiving vehicle and wherein the automated settings control system comprises:

a specific cart matching component that accesses a set of feature-to-settings maps, each feature-to-settings map mapping optical features to till settings values, to identity, as the map, a matching feature-to-settings map that has optical features that match the optical feature identified from the corresponding portion of the receiving vehicle.

3. The harvester control system of claim 2, wherein the specific cart matching component is configured to, if a matching feature-to-settings map is identified, obtain the settings values from the matching map and provide the fill settings values obtained from the matching feature-to-settings map to the settings output component.

4. The harvester control system of claim 2 and further comprising:
   a new cart processing system configured to, if no matching feature-to-settings map is identified, detect fill settings values input by an operator corresponding to the receiving vehicle and generate a feature-to-settings map that maps the optical feature of the receiving vehicle to the fill settings values input by the operator and provide the fill settings values input by the operator to the settings output component.

5. The harvester control system of claim 4, wherein the new cart processing system comprises:
   a new cart identification system that generates an operator interface indicator identifying the receiving vehicle as a new receiving vehicle for which no matching feature-to-settings map is found;
   a new settings detector that detects the fill settings values input by the operator corresponding to the new receiving vehicle; and
   a feature-to-settings map generator that generates the feature-to-settings map corresponding to the new receiving vehicle.

6. The harvester control system of claim 1, wherein the automated settings control system comprises:
   a cart type classifier that identifies a cart type, indicative of a type of the receiving vehicle, based on the optical characteristic of the receiving vehicle.

7. The harvester control system of claim 6, wherein the automated settings control system comprises:
   a cart type matching component that accesses a set of cart type-to-settings maps, each cart type-to-settings map mapping a cart type value to a set of fill settings values, to identify a matching map that has a cart type value that matches the cart type of the receiving vehicle identified by the cart type classifier.

8. The harvester control system of claim 7, wherein the cart type matching component is configured to, if a matching cart type-to-settings map is identified, obtain the set of fill settings values from the matching cart type-to-settings map and provide the fill settings values obtained from the matching cart type-to-settings map to the settings output component.

9. The harvester control system of claim 7, wherein the automated settings control system comprises:
   a new cart type processing system that generates an operator interface indicator identifying the receiving vehicle as being of a new receiving vehicle type for which no matching cart type-to-settings map is found;
   a new settings detector that detects operator input settings values corresponding to the new receiving vehicle type; and
   a cart type-to-settings map generator that generates a cart type-to-settings map corresponding to the new receiving vehicle.

10. The harvester control system of claim 9, wherein the new cart type processing system comprises:
    a classifier training system that trains the cart type classifier to recognize carts having the cart type of the receiving vehicle based on the optical characteristic of the receiving vehicle.

11. A computer implemented method of controlling a harvester to fill a receiving vehicle with harvested material, the computer implemented method comprising:
    generating an image of a portion of a receiving vehicle;
    identifying an optical characteristic of the receiving vehicle based on the image of the portion of the receiving vehicle;
    searching a data store to identify a map based on the optical characteristic of the receiving vehicle, the map including fill settings;
    obtaining fill settings corresponding to the optical characteristic of the receiving vehicle, based on the identified map; and
    automatically controlling a position of a spout on the harvester during a filling operation, during which the harvester fills the receiving vehicle with harvested material, based on the till settings.

12. The computer implemented method of claim 11 wherein identifying an optical characteristic comprises identifying an optical feature of the portion of the receiving vehicle and wherein obtaining fill settings comprises:
    accessing a set of feature-to-settings maps, each feature-to-settings map mapping optical features to settings values; and
    identifying a feature-to-settings map as a matching map if the feature-to-settings map has optical features that match the optical feature identified from the corresponding portion of the receiving vehicle.

13. The computer implemented method of claim 12 and further comprising:
    if a matching map is identified, obtaining the settings values from the matching map as the fill settings.

14. The computer implemented method of claim 12 and further comprising:
    if no matching map is identified, detecting operator input settings values corresponding to the receiving vehicle; and
    generating a feature-to-settings map that maps the optical feature of the receiving vehicle to the operator input settings values; and
    using the operator input settings values as the till settings.

15. The computer implemented method of claim 14 wherein generating a feature-to-settings map comprises:
    generating an operator interface indicator identifying the receiving vehicle as a new receiving vehicle for which no matching feature-to-settings map is found;
    detecting the operator input settings values corresponding to the new receiving vehicle; and
    generating the feature-to-settings map corresponding to the new receiving vehicle.

16. The computer implemented method of claim 11 wherein obtaining till settings comprises:
    applying the optical characteristic of the receiving vehicle to a classifier to identify a cart type, indicative of a type of the receiving vehicle; and
    accesses a set of cart type-to-settings maps, each cart type-to-settings map mapping a cart type value to a set of settings values, to identify a matching map that has a cart type value that matches the cart type of the receiving vehicle identified by the classifier.

17. The computer implemented method of claim 16 wherein obtaining the fill settings comprises:

if a matching map is identified, obtaining the set of settings values from the matching map.

18. The computer implemented method of claim 17 wherein obtaining the fill settings comprises:
- if no matching cart type-to-settings map is found, generating an operator interface indicator identifying the receiving, vehicle as being of a new receiving vehicle type;
- detecting operator input settings values corresponding to the new receiving vehicle type; and
- generating a cart type-to-settings map corresponding to the new receiving vehicle.

19. The computer implemented method of claim 18 and further comprising:
- if no matching cart type-to-settings value is found, training the classifier to recognize carts having the cart type of the receiving vehicle.

20. A computer implemented method of controlling a harvester to fill a receiving vehicle with harvested material, the computer implemented method comprising:
- generating an image ala portion of a receiving vehicle;
- identifying an optical feature of the receiving vehicle based on the image of the portion of the receiving vehicle;
- searching a data store and determining whether a matching feature-to-fill settings map is identifiable in the data store based on the optical feature;
- if a matching feature-to-fill settings map is identifiable, obtaining fill settings in the matching feature-to-fill settings map as selected fill settings;
- if a matching feature-to-fill settings map is not identifiable, then determining whether a cart type-to-till settings map is identifiable based on the optical feature;
- if a matching cart type-to-fill settings map is identifiable, then obtaining fill settings in the matching cart type-to-fill settings map as selected fill settings;
- if a matching cart type-to-fill settings map is not identifiable, then obtaining operator input fill settings as selected fill settings; and
- automatically controlling a position of a spout on the harvester during a filling operation, during which the harvester fills the receiving vehicle with harvested material, based on the selected fill settings.

* * * * *